United States Patent [19]

Randolph

[11] Patent Number: 5,233,939
[45] Date of Patent: Aug. 10, 1993

[54] ANIMAL CAGE

[76] Inventor: Arthur J. Randolph, P.O. Box 1541, Santa Rosa, Calif. 95402

[21] Appl. No.: 905,783

[22] Filed: Jun. 29, 1992

[51] Int. Cl.[5] ............................................. A01K 31/00
[52] U.S. Cl. .................................... 119/17; 119/752; 217/64
[58] Field of Search .............. 119/17, 19, 96, 98, 119/99; 217/64

[56] References Cited

U.S. PATENT DOCUMENTS

| | | | |
|---|---|---|---|
| 275,969 | 4/1883 | Woodside | 217/64 |
| 524,163 | 8/1894 | Coleman | 217/64 |
| 1,667,998 | 5/1928 | Woodworth | 119/17 |
| 3,187,721 | 6/1965 | Cappel | 119/99 |
| 3,399,654 | 9/1968 | Schroer | 119/19 |
| 3,760,768 | 9/1973 | Patterson | 119/17 |
| 3,791,347 | 2/1974 | Lovell | 119/17 X |
| 3,918,406 | 11/1975 | Patterson | 119/96 |
| 4,367,696 | 1/1983 | Hamann | 119/96 |
| 4,991,543 | 2/1991 | Silberman | 119/17 |

Primary Examiner—Gene Mancene
Assistant Examiner—T. Price
Attorney, Agent, or Firm—Larry D. Johnson

[57] ABSTRACT

An animal cage provides a rectangular box-like cage structure having a top, bottom, right and left sides, and openable front and back ends, together defining an internal cavity. A movable internal vertical wall is adjustably supported on the structure top, and a movable internal horizontal wall is adjustably supported on one of the structure sides. An animal may be placed in the cage, and the vertical and horizontal inner walls slowly moved to restrict the animal, so that a user may inoculate or otherwise treat the animal safely.

7 Claims, 3 Drawing Sheets

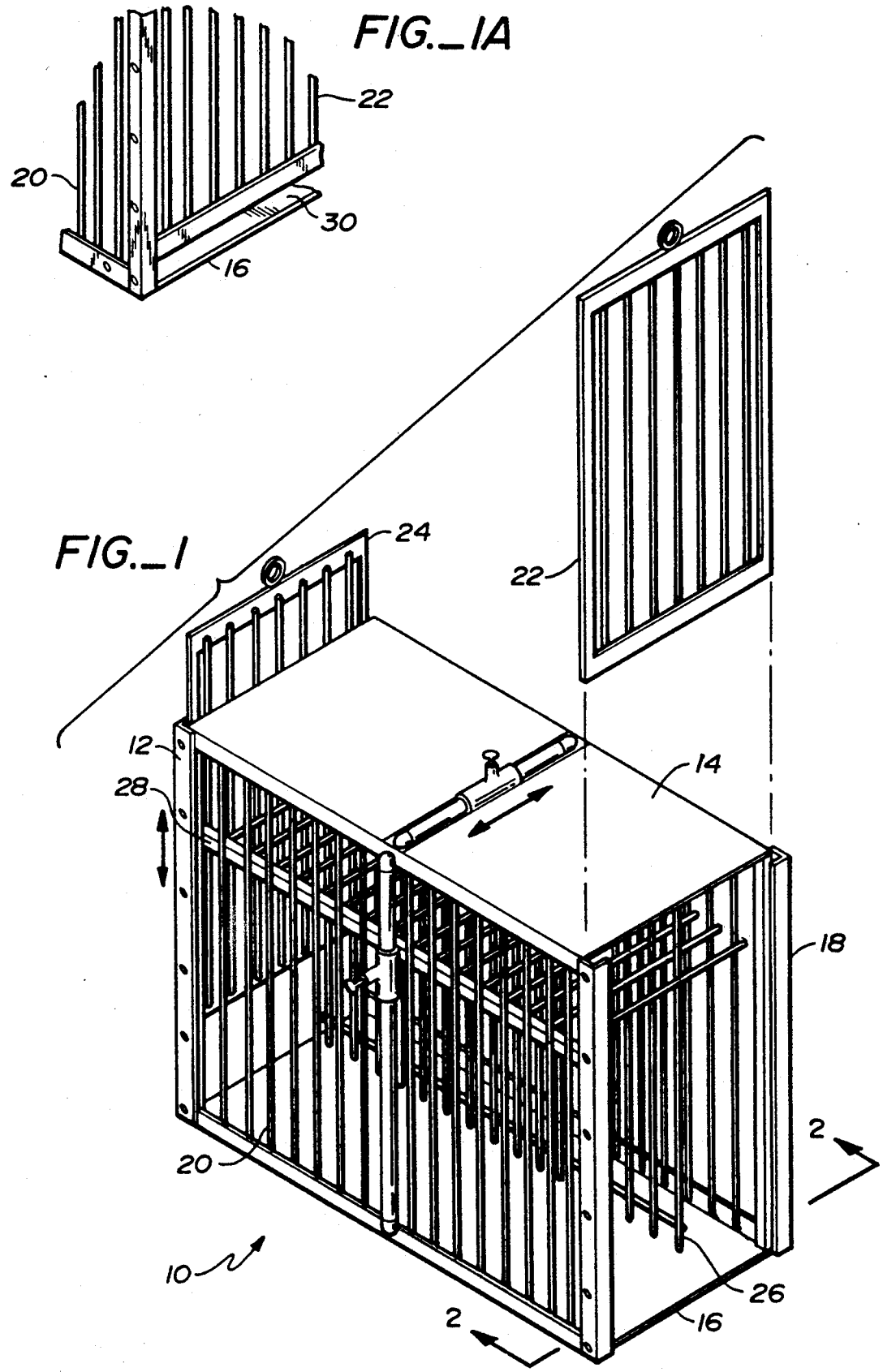

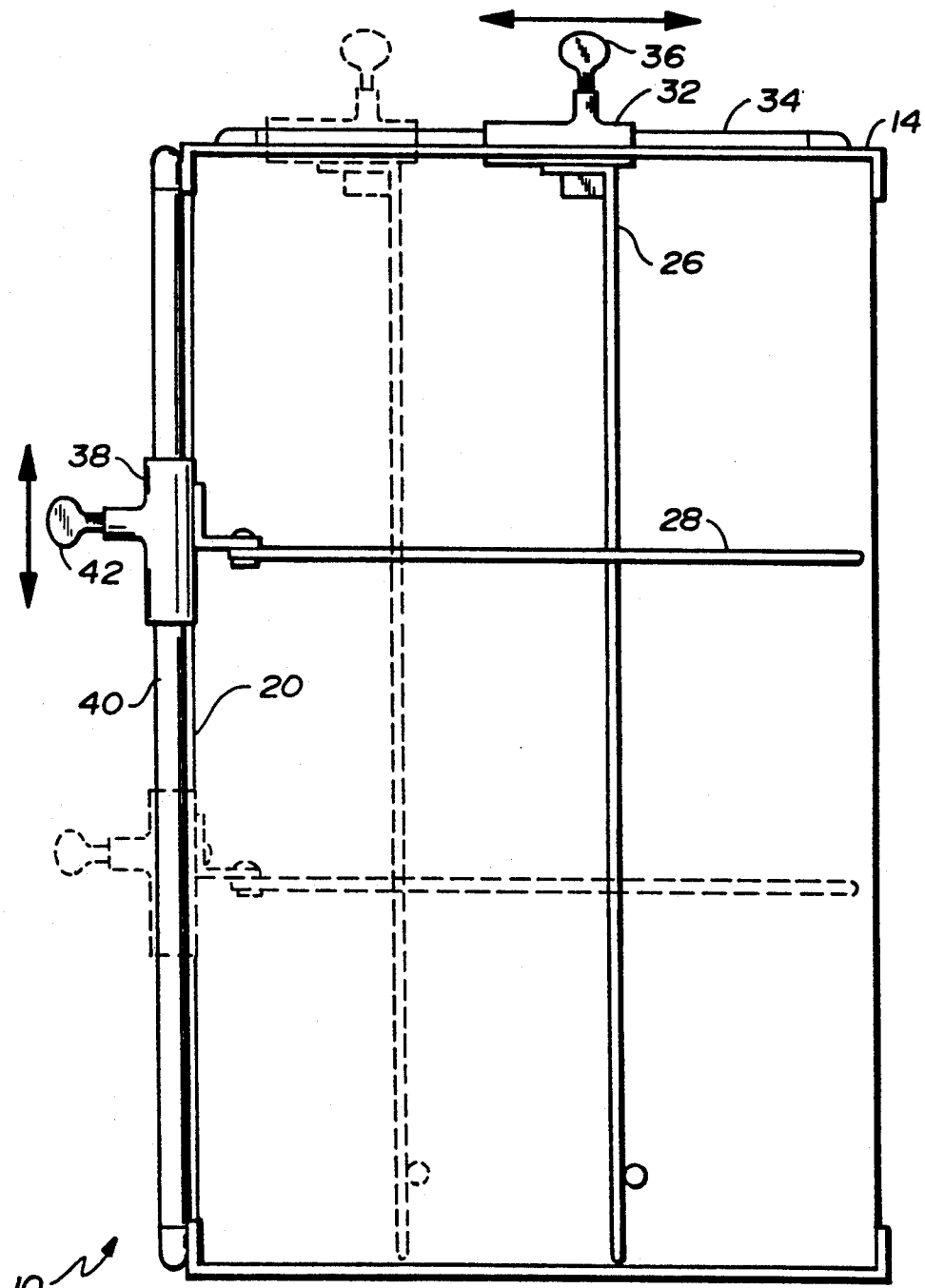
FIG._2

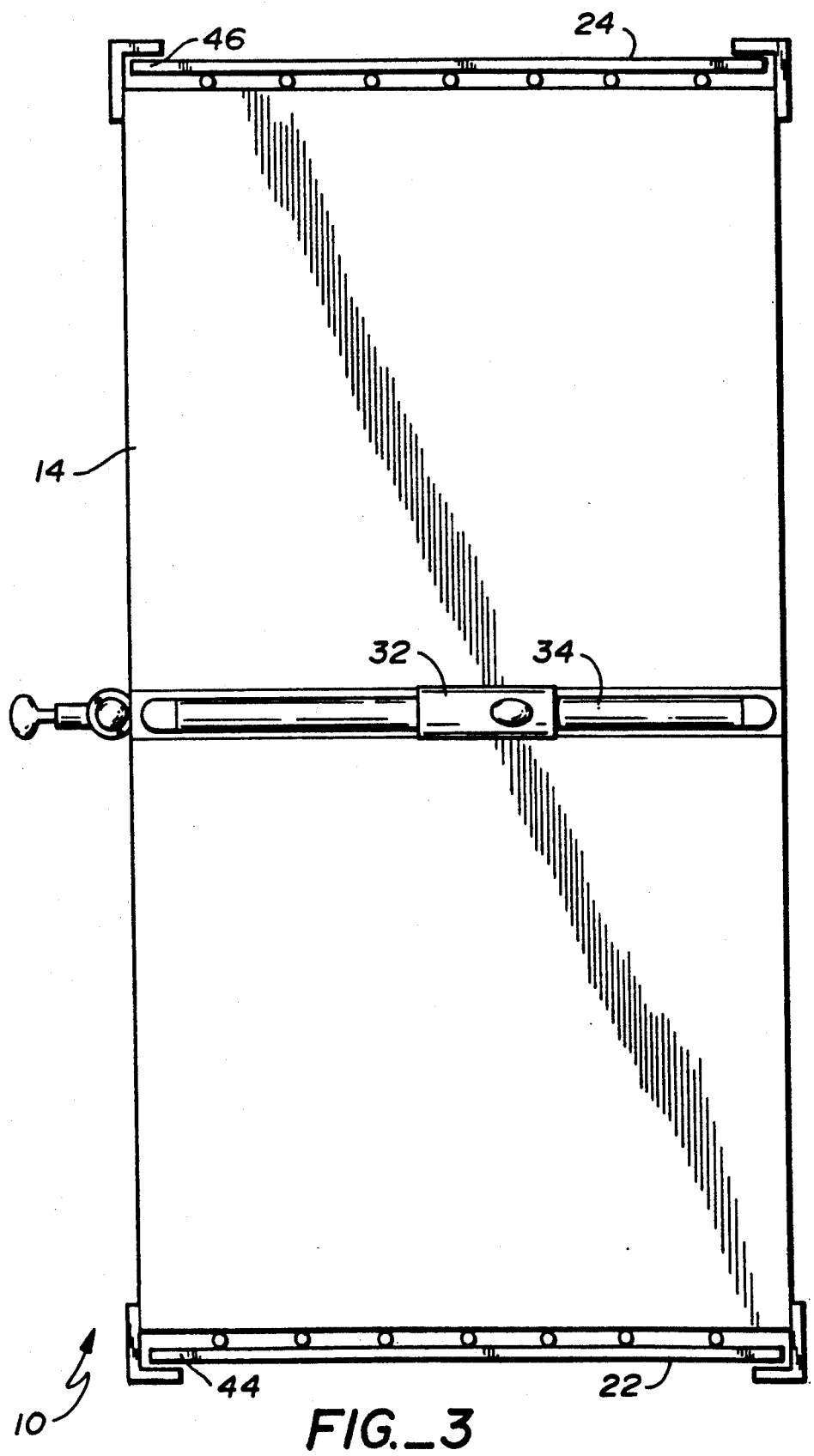
FIG._3

ANIMAL CAGE

BACKGROUND OF THE INVENTION

1. Field of the Invention

This invention relates generally to animal cages and carriers, and more specifically to an improved cage and restraining apparatus for small animals.

2. Description of the Prior Art

Small animal cages, carriers, and kennels are well known and in widespread use. However, it is often difficult to safely inoculate or otherwise treat an animal, even when it has been confined in such a cage, because the animal can freely move about the cage.

SUMMARY OF THE INVENTION

The animal cage of this invention provides a rectangular box-like cage or kennel structure having a top, bottom, right and left sides, and openable front and back ends, together defining an internal cavity. A movable internal vertical wall is adjustably supported on the structure top, and a movable internal horizontal wall is adjustably supported on one of the structure sides. An animal (such as a cat) may be placed in the cage, and the vertical and horizontal inner walls slowly moved laterally and downward respectively, to restrict the animal, so that a vet or other user may inoculate or otherwise treat the animal.

Use of this inventive structure provides a safety factor to the user by restraining the animal and preventing it from scratching or otherwise injuring the user. In addition, the structure provides a safety factor to the animal being treated, by preventing the animal from moving during inoculation or other treatment.

BRIEF DESCRIPTION OF THE DRAWINGS

FIG. 1 is a perspective view of the animal cage of this invention, illustrating a rectangular box-like structure having a top, bottom, right and left sides, and openable front and back ends, together defining an internal cavity; further illustrating a laterally movable internal vertical wall supported on the structure top, and a vertically movable internal horizontal wall supported on the structure left side;

FIG. 1a is a perspective view of the front corner of the animal cage of this invention, illustrating the movable front end in position on the animal cage structure but supported a slight distance from the structure bottom to create a gap to prevent tail capture or injury;

FIG. 2 is a front diagrammatic view of the animal cage of this invention, illustrating the movable internal vertical wall supported by and adjustably positioned along the structure top, and the movable internal horizontal wall supported by and adjustably positioned along the structure left side, this view taken along line 2—2 of FIG. 1; and FIG. 3 is a top view of the animal cage of this invention illustrating the front and back end receiving channels enabling zero-clearance opening of the movable front and back ends.

DETAILED DESCRIPTION OF A PREFERRED EMBODIMENT

FIG. 1 is a perspective view of the animal cage 10 of this invention, illustrating a rectangular box-like structure 12 having a top 14, bottom 16, right and left sides 18, 20, and movable front and back ends 22, 24, together defining an internal cavity. This view further illustrates a laterally movable internal vertical wall 26 supported on the structure top, and a vertically movable internal horizontal wall 28 supported on the structure left side 20. Front and back ends 22, 24 are both openable, and preferably comprise vertically sliding gates so that the inventive cage may be placed immediately adjacent another cage or kennel for transfer of an animal from one cage to other.

The structure may have overall dimensions of any size, but a size on the order of twenty inches long by sixteen inches high by nine inches wide has been found to be appropriate for many veterinary applications. The top and bottom may be made of solid sheet material, and the sides and ends of a grill material, as illustrated. The finished product is preferably relatively heavy and stable, with rubber feet or other non-skid material on the bottom, and screws together for assembly and disassembly for ease in shipping and storage.

FIG. 1a is a perspective view of the front corner of the animal cage of this invention, illustrating the movable front end 22 in position on the animal cage structure but supported a slight distance from the structure bottom 16 to create a gap 30 to prevent tail capture or injury. This gap may be adjustable by selective placement of a stop member or other feature.

FIG. 2 is a front diagrammatic view of the animal cage 10 of this invention, illustrating the laterally movable internal vertical wall 26 supported by and releasably securable along the structure top 14, and the vertically movable internal horizontal wall 28 supported by and releasably securable along the structure left side, this view taken along line 2—2 of FIG. 1. Vertical wall 26 may be supported by sliding segment 32 carried on rod 34, and releasably secured by thumb screw 36. Horizontal wall 28 may be supported by sliding segment 38 carried on rod 40, and releasably secured by thumb screw 42. By using such a sliding arrangement, the walls are essentially infinitely adjustable. These internal walls are preferably grill-like in structure, to enable them to intersect with one another without interference.

FIG. 3 is a top view of the animal cage 10 of this invention illustrating the front and back end receiving channels 44, 46 enabling zero-clearance opening of the movable front and back ends 22, 24. This view further illustrates how vertical wall sliding segment 32 and rod 34 may be incorporated into a gap in top 14.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An animal cage comprising:
   a rectangular box-like cage structure having a top, bottom, right and left sides, and openable front and back ends, together defining an internal cavity;
   a movable internal vertical wall supported on said structure top; and
   a movable internal horizontal wall supported on one of said structure sides.

2. The animal cage of claim 1 wherein said front and back ends comprise vertically sliding gates.

3. The animal cage of claim 2 wherein said front end vertically sliding gate includes a gap portion to prevent capture of an animal's tail.

4. The animal cage of claim 1 wherein said internal vertical wall is supported by a sliding segment carried on a rod.

5. The animal cage of claim 1 wherein said internal horizontal wall is supported by a sliding segment carried on a rod.

6. The animal cage of claim 1 wherein said internal vertical wall includes means for releasably securing said wall in a selected lateral position.

7. The animal cage of claim 1 wherein said internal horizontal wall includes means for releasably securing said wall in a selected vertical position.

* * * * *